United States Patent [19]

Wright

[11] 4,073,062
[45] Feb. 14, 1978

[54] LEVEL

[76] Inventor: Donald E. Wright, 14265 Juneau Blvd., Elm Grove, Wis. 53122

[21] Appl. No.: 734,241

[22] Filed: Oct. 20, 1976

Related U.S. Application Data

[63] Continuation of Ser. No. 592,731, July 3, 1975, abandoned.

[51] Int. Cl.² ............................................. G01C 9/28
[52] U.S. Cl. ................................................. 33/388
[58] Field of Search ............................... 33/383–388, 33/390

[56]  References Cited

U.S. PATENT DOCUMENTS

| | | | |
|---|---|---|---|
| 1,133,936 | 3/1915 | Coughlin | 33/384 |
| 1,172,971 | 2/1916 | Frank | 33/348 |
| 1,300,818 | 4/1919 | Collins | 33/388 X |
| 1,703,589 | 2/1929 | Myers | 33/387 |
| 1,822,740 | 9/1931 | Loeser et al. | 33/386 X |
| 1,927,504 | 9/1933 | Rudolff | 33/383 |
| 2,692,440 | 10/1954 | Walters | 33/383 |

FOREIGN PATENT DOCUMENTS

| | | | |
|---|---|---|---|
| 519,048 | 3/1955 | Italy | 33/388 |

Primary Examiner—Charles E. Phillips

[57]  ABSTRACT

A level comprises a frame including a working surface, a level vial containing bubble indicating means and having bubble registry means adapted to register a level position when the longitudinal axis of the vial is positioned in a horizontal plane, and selectively adjustable mounting means for adjustably mounting the level vial to the frame for variable, selective angular alignment of the longitudinal axis thereof with respect to the plane of the working surface whereby the preselected orientation of the bubble indicating means with the register means of the level vial indicates a pre-selected angular relationship of the longitudinal vial axis and the working surface when the working surface is in contact with a surface being measured.

6 Claims, 5 Drawing Figures

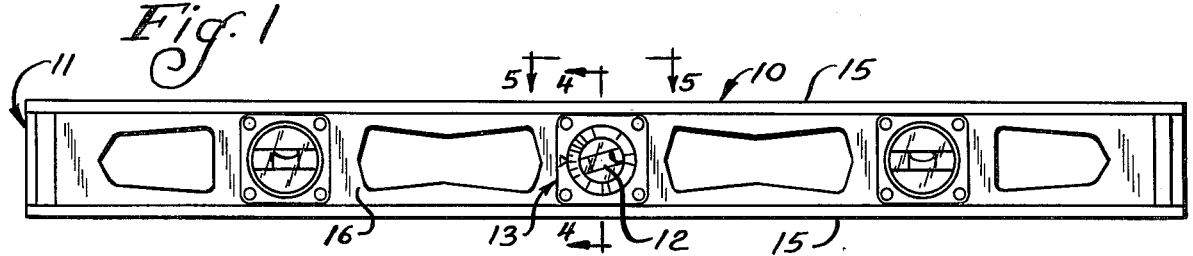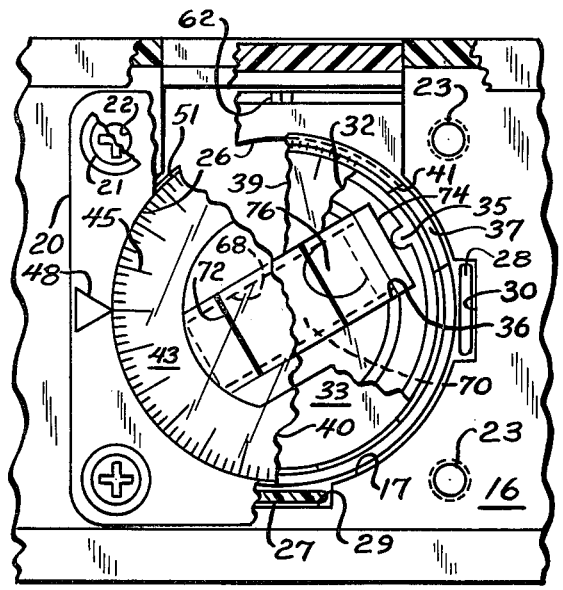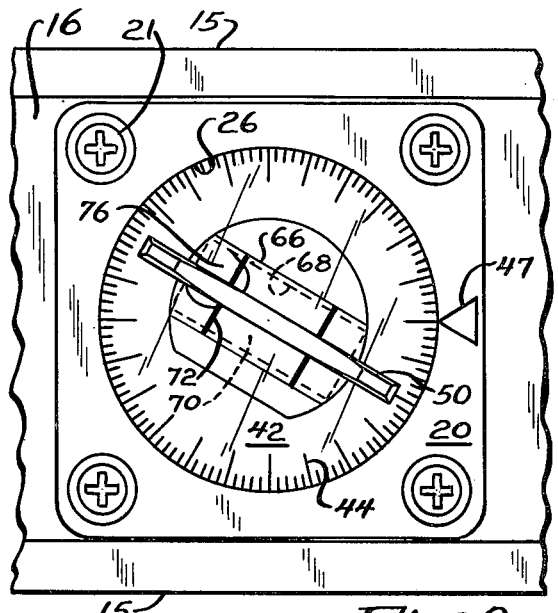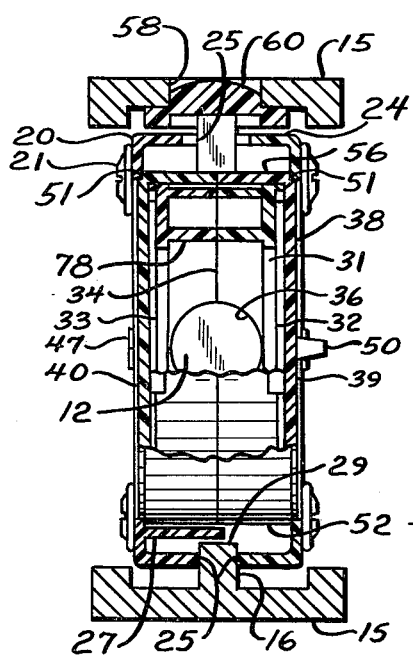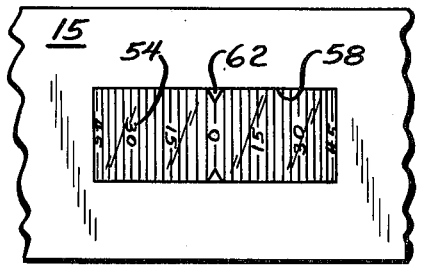

LEVEL

This is a continuation, of application Ser. No. 592,731 filed July 3, 1975, and is now abandoned.

BACKGROUND OF THE INVENTION

This invention relates generally to level instruments and more particularly in this instance, to a level unit having plural angle indicating capabilities. This invention provides an accurate means for measuring or laying out a virtually infinite number of angularly disposed work surfaces.

Heretofore, conventional type levels are generally provided with one or more level indicating vials to indicate whether or not a given surface is horizontal. Similarly, convential levels are provided with one or more additional indicating vials positioned at 90° with respect to the horizontal indicating vials and surfaces of the level to indicate whether or not a given surface is vertical when the level working surface is placed against it. Further, other types of commercially available levels are provided with one or more vials oriented at a 45° angle with respect to the level's work surfaces. Such vial orientation on the level frame provides an indication as to whether or not the surface upon which the level is placed is positioned at a 45° angle.

It has been discovered that a new and improved level having level indicating means, adjustable to an infinite number of angular positions with respect to the working surfaces of the level, can be provided simply by incorporating a level vial of the general type illustrated and described in U.S. Pat. No. 3,311,990, which issued to D. E. Wright on Apr. 4, 1967, and freely rotatable mounting means disposed on a level frame. This combination produces a level unit having versatile capabilities.

In general, the level of the present invention makes available to its user a precise measuring tool which can be easily employed to determine virtually any angle of incline or slope of a given work surface. In another application, the level of the present invention may be used in any type of construction to produce any desired angular orientation of structural members during assembly.

Levels made in accordance with the present invention can be manufactured economically utilizing readily available commercial plastic materials and conventional plastic molding and extruding techniques. Nevertheless, the design of the level elements of the present invention enable precision to be achieved in part fabrication, which not only greatly simplifies assembly of the units, but also makes such assembly possible in the absence of highly skilled labor. This permits the realization of significant labor saving cost reductions in manufacture.

In utilizing the level instrument of the present invention, there are provided dual radial and co-axial calibrations of vial support surfaces which it makes it possible to obtain angular accuracy within a degree of less.

By incorporating the adjustable mounting means which is adjustable to an infinite number of angular positions of the present invention into a conventional horizontal-level unit the utility and marketability of the resulting level instrument can be very significantly increased.

SUMMARY OF THE INVENTION

Accordingly, it is an object of the present invention to provide a new and improved level having the various abovementioned features.

Another object of the present invention is to provide a novel level having level indicating means which can be adjusted to an infinite number of angular positions with respect to the working surfaces of the level.

It is an object of the present invention to provide a new and improved level having level indicating means thereof which can be readily adjusted manually.

An object of the present invention is to provide a new and improved level having level indicating means which can be adjusted to substantially an infinite number of angular positions and wherein dual radial and co-axial calibrations of vial support surfaces can be provided to facilitate reading of any level inclination thereby established.

In accordance with these aims and objectives, the present invention is concerned with the provision of a level comprising a frame including a working surface, a level vial containing bubble indicating means and having bubble registry means adapted to register a level position when the longitudinal axis of the level is positioned in a horizontal plane, and selectively adjustable mounting means for adjustably mounting the level vial to the frame for variable, selective angular alignment of the longitudinal axis thereof with respect to the plane of the working surface whereby the pre-selected orientation of the bubble indicating means with the register means of the level vial indicates a pre-selected angular position of the longitudinal vial axis and the working surface when the working surface is in contact with a surface being measured.

DESCRIPTION OF THE DRAWINGS

The above and other objects and advantages of the present invention will become more fully apparent from the following detailed description when read in conjunction with the accompanying drawings and wherein:

FIG. 1 is a front elevational view of the level instrument of the present invention showing the general interrelationship of the level frame and its components;

FIG. 2 is a partial and enlarged front elevational view of the center vial mounting of the level of FIG. 1 with elements thereof variously broken away and sectioned to show the details of the structure of such elements thereof;

FIG. 3 is a partial and enlarged back elevational view of the center vial mounting of FIG. 2 showing the radially oriented indicating means thereof adjusted to a 30° inclination with respect to the working surfaces on the level frame;

FIG. 4 is a section view taken along the line 4—4 of FIG. 1 showing the detailed orientation of the assembled elements of the level of the present invention; and FIG. 5 is a partial top plan view of that portion of the level of the present invention illustrated in FIGS. 2, 3 and 4, and showing a 30° inclination as represented by the co-axially located indicating means formed on the generally cylindrical rotatable vial support, which is made visible through the upper blocking surface of the level.

DETAILED DESCRIPTION OF THE PREFERRED EMBODIMENT

Referring now to the drawings, a level generally represented by numeral 10 is shown in FIGS. 1–5 for the purpose of illustrating and describing the novel features of the present invention. As shown in FIG. 1, the level 10 comprises a frame 11, a level vial 12, and mounting means 13 for adjustably mounting the level vial 12 on the frame 11.

As best seen in FIG. 1, the frame 11 includes two elongated flat and parallel working surfaces 15 interconnected by an apertured web 16. An aperture 17 (FIG. 2) is broached into the web 16 during manufacture for receiving and for retaining the level vial 12 and the adjustable mounting means, generally designated 13, therein.

As shown in FIG. 4, the vial mounting means 13, which serves to support the vial 12 for rotation, is retained for rotation on the web 16 of the frame by a pair of thrust or coverplates 20, the plates 20 being positioned on opposite sides of the web and over the web aperture 17. The respective cover or thrust plates 20 are secured to the web 16 by screws 21 inserted through openings 22 therein and threaded into tapped apertures 23 (FIG. 2) in the web 16.

Each of the cover or retaining plates 20 is provided with inturned lateral sides 24 to provide predetermined lateral spacing from the web 16 and having an end surface 25 (FIG. 4) engaging the web 16 to provide a rigid housing when the plates 20 are secured to the web 16. Each plate is further formed with a bearing or thrust aperture 26 (FIGS. 2–4) and an orientation finger 27 or 28 which serve respectively to be keyed into notches 29 and 30 broached on the periphery of the web aperture 17 for appropriately locating the plates 20 on the web 16.

The specific construction of the vial mounting means, generally designated 13, is best shown in FIGS. 2 and 4. The mounting means 13 is composed of an inner vial engaging cylinder 31 formed in two molded halves 32 and 33, and assembled along line or seam 34, as best seen in FIG. 4. These inner half cylinder elements 32 and 33 are designed to receive the vial in close-fitting engagement requiring no other adjustment than the dropping of the vial 12 into one of the two halves and into engagement with opposed fingers 35, only one of which is shown in FIG. 2. The fingers 35 are located diametrically opposite each other, i.e., 180° apart on the inner vial receiving cylinder halves 32 and 33.

The construction of each molded inner cylinder half 32 and 33 affords a nesting engagement of the vial 12 within opposed end slots 36 formed in the innermost walls of the halves 32 and 33, as best seen in FIGS. 2 and 4. The slots 36 provided at opposite ends of the cylinder halves 32 and 33 form an annular vial engaging aperture when the halves 32 and 33 are joined with a vial 12 contained therebetween. This structure plus the vial abutment with the fingers 35 formed at the extremeties of the vial receiving and engaging apertures provide vial mounting without adjustment.

In the preferred embodiment of the present invention the outer periphery of the inner cylinder 31 formed by the joinder of the cylinder halves 32 and 33 is provided with plural projections or keys 37.

The combined inner cylinder 31-vial 12 assembly is positioned within an outer cylinder 38 composed of cylindrical half elements 39 and 40 which form the outer cylinder when joined along the line or seam 34 common with that of the inner cylinder 31.

The co-axial inner wall of the outer cylinder 38 is provided with plural grooves 41 which accommodate the keys 37 projecting from the inner cylinder 31 in order to establish a pre-determined orientation with the vial contained in the inner cylinder with respect to the outer cylinder. Again, this is done merely by assembly and without any requirement of skillful adjustment or calibration.

The seam 34 defining the point of joinder of the outer cylinder halves 39 and 40 all substantially analagous to the inner cylinder halves 32 and 33 with the exception of a pair of diametrically opposed matching key and slot elements (not shown) permitting orientation of the outer cylinder halves in a pre-determined alignment.

As shown in FIGS. 2 and 3, outer faces or radial surfaces 42 and 43 are provided with serially spaced indicator marks 44 and 45 respectively. These indicator marks extend from the axis of rotation of the vial and inner-outer cylinder assembly and serve as indicator means or angular calibration extending from the pre-determined angular relationships with respect to the longitudinal axis of the vial 12. The cover or plates 20 are provided with indexing points 47 and 48 so as to indicate the angular position of the inner cylinder 31 relative to the indicator marks 44 and 45, as for example, a 30° inclination as shown in FIG. 3. While these indicator marks are shown in the drawings to be made on the outer or facing radial surfaces 42 and 43 of the outer cylinder 38, it is considered within the purview of this invention to alternatively place such indicator marks on the inner radial surface of the cylinder halves 39 and 40 or on the corresponding surfaces of the inner cylinder halves 32 and 33. Further, in some applications, it may be desired or necessary to provide indicator marks on only one side of the web.

As shown in FIGS. 3 and 4, cylinder half 39 of the outer cylinder 38 is formed with a radially extending finger grip 50 extending along the longitudinal axis of the vial 12. This finger grip enables the level user to selectively rotate the cylinder half 39 via the various key and slot connections throughout the entire cylinder-vial assembly.

As is best shown in FIGS. 2 and 4, each of the outer cylinder halves 39 and 40 is provided with an annular groove 51 axial thrust retaining means adjacent the annular periphery thereof. This groove 51 is designed to be engaged with the innermost edge of that portion of each cover or plate 20 adjacent the bearing or thrust aperture 26 thereof. Therefore, when the dual cylinder and vial assembly is inserted into the web aperture 17 formed in the frame thereof and the cover or plates 20 are secured as shown to the web, the vial can be freely rotated on its transverse axis and an infinite number of angular positions or displacements of the vial 12 with respect to the working surfaces 15 can be selectively produced by the user of the unit.

Referring now to FIG. 5, angular calibrations 54 similar to the indicator marks 44 and 45, are provided on cylindrical surface 56. An opening 58 is disposed in the top working surface 15 so as to permit the angular calibrations 54 on the cylindrical surface 56 to be visible therethrough. It is to be understood that the opening 58 can be alternatively positioned in the bottom working surface 15 or on both working surfaces. A transparent window or a magnifying lens 60 is located in the opening 58 so as to facilitate visual observation of the angular calibrations 54 and to seal the mounting means 13 from dust, dirt and other extraneous and possible harmful materials. One or more indexing points 62 are positioned in the opening 58 to indicate the angular position of the cylinder 31 relative to the angular calibrations 54.

The level vial 12 is preferably a single vial 43 having a central barrel shaped portion 68 and is substantially filled with a colored or other easily visible fluid 70 so that when the vial 66 is held horizontally bubble indicating means defined by air space 76 not occupied by the fluid 70 will become evenly positioned between bubble registry means defined by level indicating lines 72 on the vial 66. The vial 66 is also provided with indentations 74 in the ends thereof to accommodate the projections or fingers 35 of the cylinder 31 to locate the vial along a diameter of the cylindrical surface 78.

In operation, the level 10 as previously stated is utilized to determine the angle of incline of a given work surface or to produce a desired angular orientation of the structural members during assembly. Specifically, when the level 10 is utilized to determine the angle of inclination or slope of a given work surface, the mounting means 13 is rotated manually by exerting a rotating force on the finger grip 50 until the level vial 66 indicates that it is level, i.e., the air space 76 being equally positioned between the level indicating lines 74. The indicator marks 44 and 45 adjacent the respective indexing points 47 and 48 or the angular calibrations 54 adjacent the indexing points 62 will then indicate the angle of inclination of the level vial 66 with respect to the working surfaces 15. In the other application, when the level 10 is used to produce a desired angular orientation of a given work surface, the level 10 is initially placed on the given work surface in which the inclination is to be produced, and the mounting means 13 is then rotated so that the indexing points 47, 48 or 62 are opposite the respective angular calibrations 44, 45 or 54 which indicates the angle of inclination desired for the given work surface. The given work surface is then rotated until the level vial 66 indicates that it is level as above-described. Thus, the angular orientation is established for the given work surface and elements containing such surface can be nailed or otherwise affixed or supported at such desired angular orientation.

From the foregoing description of the level embodying the present invention, it can be seen that there is provided an improved level having a level vial which is angularly adjustable to an infinite number of angular positions with respect to the working surfaces of the level so as to permit the accurate measuring or laying out of angles of inclination for a given surface to which the work surfaces of the level are applied. Further, the level of the present invention is provided with means for readily adjusting the inclination angles and the adjusted angles are readily visible in two planes of the level due to the dual radial and co-axial calibrations of the vial support surfaces.

While there has been illustrated and described what is at present to be a preferred embodiment of the present invention, it will be understood by those skilled in the art that various changes or modifications may be made and equivalence may be substituted for elements thereof without departing from the true spirit and scope of the invention. In addition, many modifications may be made to adapt a particular situation or material to the teachings of the invention without departing from the essential scope thereof. Therefore, it is intended that this invention should not be limited to the particular embodiment disclosed as a best mode contemplated for carrying out this invention, but that the invention will include all embodiments falling within the scope of the appended claims.

What is claimed is:

1. A level comprising:
   a frame including elongated and substantially planar working surfaces mounted respectively on opposite sides of said frame and in substantially normal relationship therewith;
   a level vial containing bubble indicating means and having bubble registry means adapted to register a level position when the longitudinal axis of the vial is positioned in a pre-selected plane;
   selectively adjustable mounting means for rotating freely said level vial relative to said frame for variable, selective angular alignment of the longitudinal axis thereof with respect to the plane of the working surfaces;
   said mounting means including inner and outer vial support cylinders, the inner cylinder containing the level vial and said inner cylinder being positioned within the outer cylinder, the outer cylinder being supported on the periphery thereof in an aperture in said frame for rotation about an axis disposed perpendicular to the plane of said frame;
   said inner vial support cylinders consisting of two halves, each of the halves having opposed fingers and end slots located on its innermost wall to receive the vial in a close-fitting engagement, the outer wall of each of the halves having plural keys extending therefrom;
   said outer vial support cylinders consisting of two halves, each of the halves having plural grooves located on its inner wall to accommodate the keys extending from the inner cylinder halves for establishing a pre-determined orientation with the vial contained between the inner cylinder halves with respect to the outer cylinder halves thereby allowing assembly of the vial, inner cylinder halves, and outer cylinder halves without any requirement of skilled adjustment and calibration; and
   cover plates secured to said frame for restraining the outer cylinder against axial displacement relative to said frame, whereby the pre-selected orientation of said bubble indicating means with said registry means of said level vial indicates a pre-selected angular relationship of the longitudinal vial axis and the working surfaces when the one of the working surfaces is in contact with the surface being measured.

2. A level as claimed in claim 1, wherein said outer vial support cylinder is provided with visible, radially oriented first calibration means, and wherein associated second calibration means is provided on said frame adjacent said first calibration means to permit selective indication of the position of the working surfaces in contact with a work piece when said bubble indicating means is oriented in preselected relation with said registry means.

3. A level as claimed in claim 2, wherein viewing means is provided to render the cylindrical surface of said outer vial support cylinder visible, and indicator means is positioned on the cylindrical surface adjacent said outer vial support cylinder to indicate the position of said outer cylinder with respect to a working surface of said frame as said outer cylinder and said level vial are selectively positioned in said frame.

4. A level as claimed in claim 1, wherein viewing means is provided on said frame adjacent to said frame aperture to permit the viewing of co-axial portions of said outer vial support cylinder, said viewing means including an opening in one of the working surfaces to permit visual observation of position indicator means disposed on said outer cylinder.

5. A level as claimed in claim 4, further comprising magnification means disposed adjacent said opening in said one of the working surfaces for magnifying said position indicating means.

6. A level as claimed in claim 1, wherein axial thrust retainer means are formed in said frame adjacent opposed in peripheries of said outer vial support cylinder for restraining said outer cylinder against axial displacement relative to said frame, and wherein said outer cylinder is provided with manual adjustment means to permit selective manual rotation of said outer cylinder and said level vial.

* * * * *